United States Patent
Hanson (10) Patent No.: US 11,260,921 B2
(45) Date of Patent: Mar. 1, 2022

(54) RIGID TRACK MOUNT (71) Applicant: Clark Equipment Company, West Fargo, ND (US)

(72) Inventor: Cameron Hanson, New Salem, ND (US)

(73) Assignee: CLARK EQUIPMENT COMPANY, West Fargo, ND (US)

(*) Notice: Subject to any disclaimer, the term of this patent is extended or adjusted under 35 U.S.C. 154(b) by 177 days.

(21) Appl. No.: 16/654,397

(22) Filed: Oct. 16, 2019

(65) Prior Publication Data
US 2020/0122794 A1  Apr. 23, 2020

Related U.S. Application Data (60) Provisional application No. 62/747,795, filed on Oct. 19, 2018.

(51) Int. Cl.
*B62D 55/10* (2006.01)
*B62D 55/15* (2006.01)

(52) U.S. Cl.
CPC ............. *B62D 55/10* (2013.01); *B62D 55/15* (2013.01)

(58) Field of Classification Search
CPC ................................ B62D 55/10; B62D 55/15
See application file for complete search history.

(56) References Cited

U.S. PATENT DOCUMENTS

| | | | |
|---|---|---|---|
| 2,786,724 A | 3/1957 | Armington | |
| 3,037,571 A * | 6/1962 | Zelle | B62D 55/084 180/9.48 |
| 3,871,462 A | 3/1975 | Krolak et al. | |
| 4,186,812 A | 2/1980 | Sutton | |
| 4,386,673 A * | 6/1983 | Carter | B62D 55/062 180/9.1 |
| 5,505,274 A | 4/1996 | Satzler | |
| 5,894,908 A | 4/1999 | Eftefield | |
| 6,513,614 B2 | 2/2003 | Knutson et al. | |
| 6,719,075 B2 | 4/2004 | Kamikawa | |
| 6,832,659 B1 * | 12/2004 | Bares | B62D 55/084 180/19.1 |
| 7,036,622 B2 | 5/2006 | Iwaki | |
| 7,156,200 B2 | 1/2007 | Dershem et al. | |
| 7,552,785 B2 | 6/2009 | Tuhy | |
| 7,798,260 B2 | 9/2010 | Albright et al. | |
| 7,815,000 B2 | 10/2010 | Kisse et al. | |

(Continued)

FOREIGN PATENT DOCUMENTS

EP 1468901 A2 10/2004
JP H11208537 A 8/1999

OTHER PUBLICATIONS

International Search Report and Written Opinion dated Feb. 6, 2020 for International Application No. PCT/US2019/056477 filed Oct. 16, 2019, 13 pages.

*Primary Examiner* — Jacob D Knutson
(74) *Attorney, Agent, or Firm* — John Veldhuis-Kroeze; Westman, Champlin & Koehler, P.A.

(57) ABSTRACT

Disclosed embodiments include track mounts configured to secure a track assembly to a frame of a power machine, and power machines including the same. The track mounts include a mounting flange which secures to a side of the power machine frame. The track mounts also include a connecting structure extending between the mounting flange and a tack frame of the track assembly.

10 Claims, 7 Drawing Sheets

(56) References Cited

U.S. PATENT DOCUMENTS

| | | | |
|---|---|---|---|
| 7,832,519 B2 | 11/2010 | Sakamoto et al. | |
| 7,857,083 B2 | 12/2010 | Oyamada et al. | |
| 7,866,700 B2 | 1/2011 | Weibling et al. | |
| 7,967,087 B2 * | 6/2011 | Arulraja | B62D 55/108 180/9.5 |
| 8,047,311 B2 * | 11/2011 | Waletzko | E02F 9/10 180/9.5 |
| 8,146,700 B2 | 4/2012 | Rousseau | |
| 8,327,969 B2 | 12/2012 | Rousseau | |
| 8,573,336 B2 * | 11/2013 | Arulraja | B62D 55/14 180/9.5 |
| 8,870,305 B2 | 10/2014 | Beasley et al. | |
| 8,899,371 B2 | 12/2014 | Uno et al. | |
| 9,650,088 B2 | 5/2017 | Haar et al. | |
| 10,494,041 B2 * | 12/2019 | Spears | B62D 55/10 |
| 2009/0256327 A1 | 10/2009 | Waletzko et al. | |
| 2014/0338991 A1 * | 11/2014 | Hansen | B62D 55/04 180/9.21 |
| 2017/0023171 A1 | 1/2017 | Khan | |

* cited by examiner

RIGID TRACK MOUNT

CROSS-REFERENCE TO RELATED APPLICATION

This application claims the benefit of U.S. Provisional Application No. 62/747,795, which was filed on Oct. 19, 2018.

BACKGROUND

The present disclosure is directed toward power machines. More particularly, the present disclosure is related to mounting structures used to mount a track frame to a machine frame of a power machine such as a track loader.

Power machines, for the purposes of this disclosure, include any type of machine that generates power for the purpose of accomplishing a particular task or a variety of tasks. One type of power machine is a work vehicle. Work vehicles, such as loaders, are generally self-propelled vehicles that have a work device, such as a lift arm (although some work vehicles can have other work devices) that can be manipulated to perform a work function. Work vehicles include loaders, excavators, utility vehicles, tractors, and trenchers, to name a few examples.

Tractive elements are devices that engage a support surface such as the ground to cause the power machine to move over the support surface. Many power machines employ endless tracks as tractive elements. Some power machines that include endless tracks include track frames with various components mounted to them for the purpose of engaging the endless track and providing proper tensioning of the endless track. These components typically include idlers, rollers, or some combination of idlers and rollers.

Track assemblies of power machines, such as track loaders, typically have a track frame secured to a machine frame of the power machine. The track frame supports at least one idler, a number of rollers, and an endless track.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

Disclosed embodiments include track mounts configured to secure a track assembly to a frame of a power machine, and power machines including the same. In some exemplary embodiments, the track mounts are rigid track mounts which are secured to the frame of the power machine with bolts, instead of being welded. The track mounts are configured to be welded to a track frame of the track assembly. In exemplary embodiments, the track mounts are welded to top and sides of the track frame, but are not secured to the bottom of the track frame.

Disclosed embodiments include power machines, such as loaders, and track mounts which secure track assemblies on sides of the power machine. One general aspect includes a track mount (314; 316) for securing a track assembly (320; 219A; 219B) to a frame (110; 210; 310) of a power machine (100; 200; 300), the track mount including: a mounting flange (332; 334) having apertures (350) positioned to receive fasteners (340) to secure the mounting flange of the track mount to a side (311) of the frame (310) of the power machine; and a connecting structure (336; 338) extending between the mounting flange and a track frame (322) of the track assembly, the connecting structure securing the track frame to the frame (310) of the power machine.

Implementations may include one or more of the following features. The track mount where the mounting flange is configured to secure the track mount only to the side (311) of the frame (310) of the power machine and not to a bottom (312) of the frame of the power machine. The track mount where the connecting structure (336; 338) includes an interface portion (352) configured to be secured to of the track frame (322) of the track assembly including to a top portion (323) thereof. The track mount where the interface portion (352) has a curvature which matches a curvature of the track frame (322). The track mount where the interface portion (352) is configured to be secured to the top portion (323) of the track frame (322) and to a side portion (325) of the track frame. The track mount where the interface portion (352) is configured to be welded to the top portion (323) and to the side portion (325) of the track frame (322), but not to a bottom portion of the track frame.

One general aspect includes a power machine (100; 200; 300), including: a power machine frame (110; 210; 310); a first track assembly (320; 219A, 219B) on a first side of the power machine; a second track assembly (320; 219A, 219B) on a second side of the power machine; first and second track mounts (314; 316) on each side of the power machine and securing the first and second track assemblies to the power machine frame, each of the first and second track mounts including: a mounting flange (332; 334) positioned adjacent a side (311) of the power machine frame and having apertures (350) positioned to secure the mounting flange to the side of the power machine frame using fasteners (340); and a connecting structure (336; 338) extending between the mounting flange and a track frame (322) of a respective one of the first and second track assemblies, the connecting structure securing the track frame to the power machine frame.

Implementations may include one or more of the following features. The power machine where the mounting flange secures the track mount only to the side (311) of the power machine frame (310) and not to a bottom (312) of the power machine frame. The power machine where the mounting flange secures the track mount only to the side (311) of the power machine frame (310) and thereby inhibits the track assembly from movement relative to the power machine frame which would cause a negative camber condition. The power machine where the connecting structure (336; 338) includes an interface portion (352) secured to the track frame (322) including, in some embodiments, to a top portion (323) thereof. The power machine where the interface portion (352) has a curvature which matches a curvature of the top portion (323) of the track frame (322). The power machine where the interface portion (352) is secured to the top portion (323) of the track frame (322) and to a side portion (325) of the track frame. The power machine where the interface portion (352) is secured to the top portion (323) and to the side portion (325) of the track frame (322) and is not secured to a bottom portion of the track frame.

DETAILED DESCRIPTION OF ILLUSTRATIVE EMBODIMENTS

The concepts disclosed in this discussion are described and illustrated with reference to exemplary embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

Disclosed embodiments include track mounts which secure a track assembly to a machine frame in power machines such as track loaders. The machine mounts can be welded to the track frame and secured with fasteners to the power machine frame and include features which improve the mounting of the track frame to the power machine frame.

Figure 2:
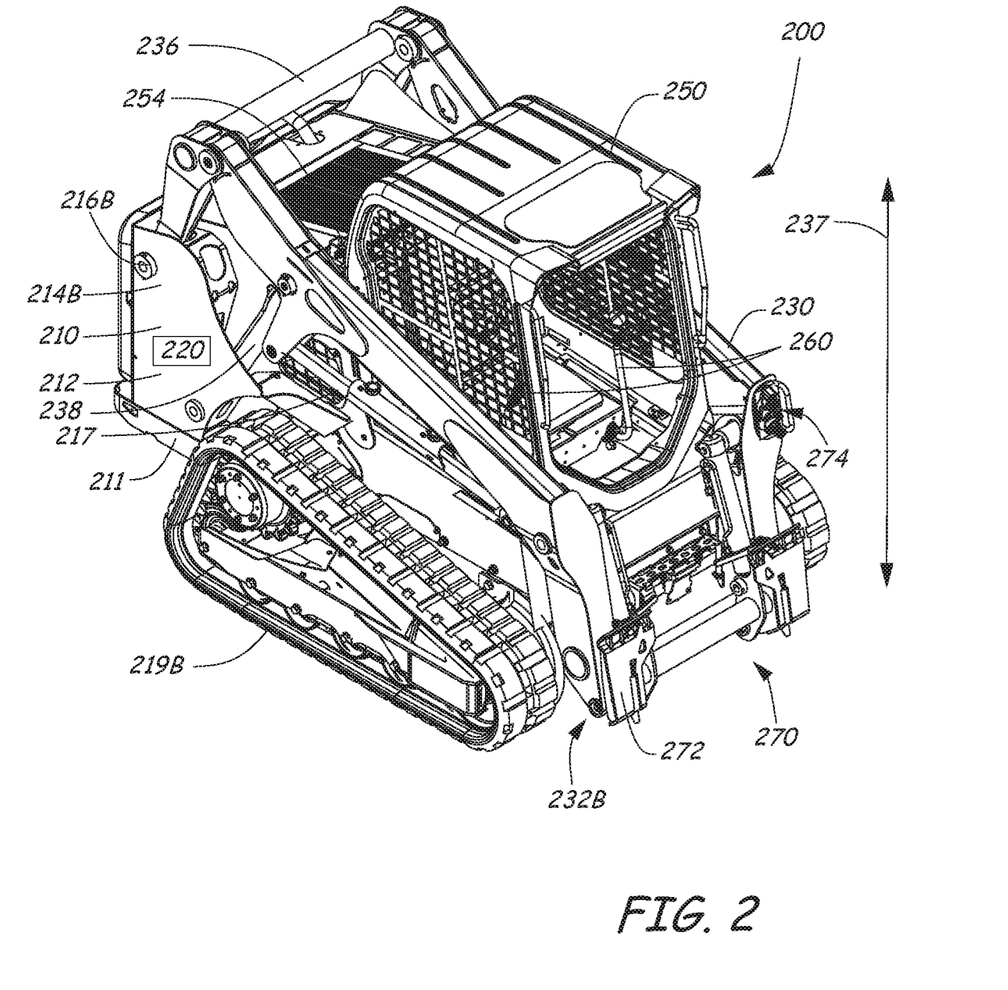
FIG. 2 is a front perspective view of a power machine on which embodiments disclosed herein can be advantageously practiced.
Figure 3:
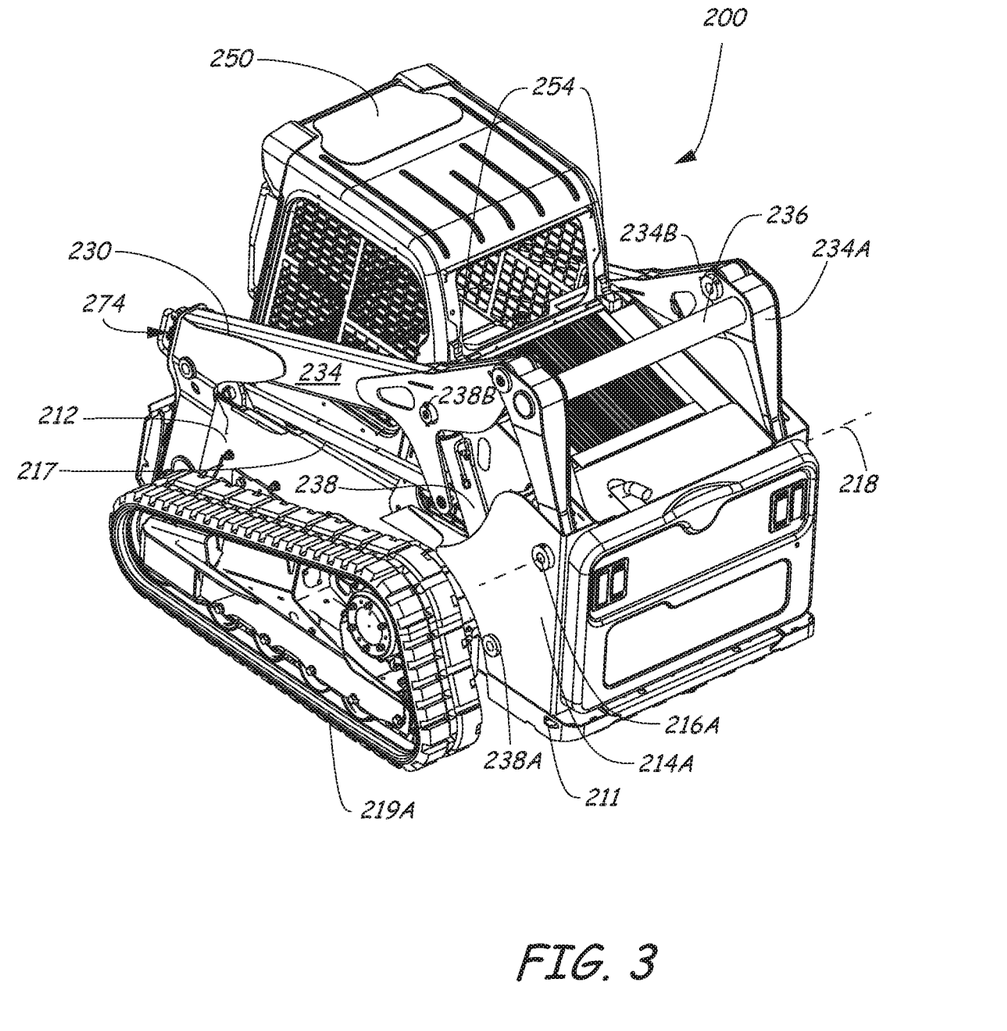
FIG. 3 is a rear perspective view of the power machine shown in FIG. 2.

These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. For the sake of brevity, only one power machine is discussed. However, as mentioned above, the embodiments below can be practiced on any of a number of power machines, including power machines of different types from the representative power machine shown in FIGS. 2-3. Power machines, for the purposes of this discussion, include a frame, at least one work element, and a power source that is capable of providing power to the work element to accomplish a work task. One type of power machine is a self-propelled work vehicle. Self-propelled work vehicles are a class of power machines that include a frame, work element, and a power source that is capable of providing power to the work element. At least one of the work elements is a motive system for moving the power machine under power.

Figure 1:
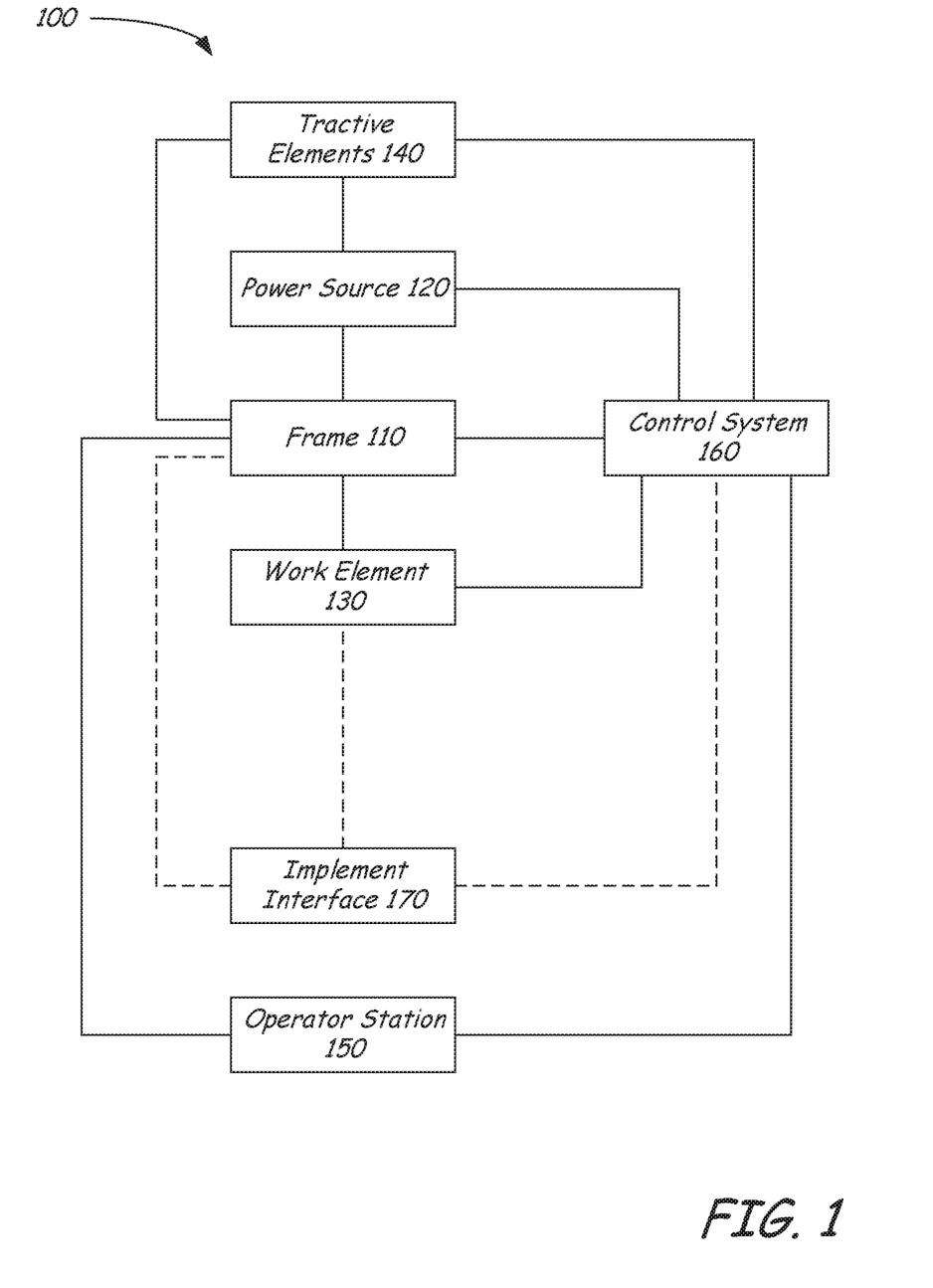
FIG. 1 is a block diagram illustrating functional systems of a representative power machine on which embodiments of the present disclosure can be advantageously practiced.

FIG. 1 illustrates a block diagram illustrates the basic systems of a power machine 100 upon which the embodiments discussed below can be advantageously incorporated and can be any of a number of different types of power machines. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that are capable of performing a dedicated task. For example, some work vehicles have a lift arm to which an implement such as a bucket is attached such as by a pinning arrangement. The work element, i.e., the lift arm can be manipulated to position the implement for the purpose of performing the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that is capable of moving with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which is capable of providing power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that capable of using it to perform a work function. Power sources for power machines typically include an engine such as an internal combustion engine and a power conversion system such as a mechanical transmission or a hydraulic system that is capable of converting the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether or not they have operator compartments or operator positions, may be capable of being operated remotely (i.e. from a remotely located operator station) instead of or in addition to an operator station adjacent or on the power machine. This can include applications where at least some of the operator controlled functions of the power machine can be operated from an operating position associated with an implement that is coupled to the power machine. Alternatively, with some power machines, a remote control device can be provided (i.e. remote from both of the power machine and any implement to which is it coupled) that is capable of controlling at least some of the operator controlled functions on the power machine.

FIGS. 2-3 illustrates a loader 200, which is one particular example of a power machine of the type illustrated in FIG. 1 where the embodiments discussed below can be advantageously employed. Loader 200 is a track loader and more particularly, a compact tracked loader. A track loader is a loader that has endless tracks as tractive elements (as opposed to wheels). Track loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. Track loader 200 is described herein to provide a reference for understanding one environment on which the embodiments described below related to track assemblies and mounting elements for mounting the track assemblies to a power machine may be practiced. The loader 200 should not be considered limiting especially as to the description of features that loader 200 may have described herein that are not essential to the disclosed embodiments and thus may or may not be included in power machines other than loader 200 upon which the embodiments disclosed below may be advantageously practiced. Unless specifically noted otherwise, embodiments disclosed below can be practiced on a variety of power machines, with the track loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220, the power system being capable of generating or otherwise providing power for operating various functions on the power machine. Frame 210 also supports a work element in the form of a lift arm structure 230 that is powered by the power system 220 and is capable of performing various work tasks. As loader 200 is a work vehicle, frame 210 also supports a traction system 240, which is also powered by power system 220 and is capable of propelling the power machine over a support surface. The lift arm structure 230 in turn supports an implement carrier interface 270, which includes an implement carrier 272 that is capable of receiving and securing various implements to the loader 200 for performing various work tasks and power couplers 274, which are provided to selective provide power to an implement that might be connected to the loader. The loader 200 can be operated from within a cab 250 from which an operator can manipulate various control devices 260 to cause the power machine to perform various functions. Cab 250 can be pivoted back about an axis that extends through mounts 254 to access components as needed for maintenance and repair.

Various power machines that are capable of including and/or interacting with the embodiments discussed below can have various different frame components that support various work elements. The elements of frame 210 discussed herein are provided for illustrative purposes and should not be considered to be the only type of frame that a power machine on which the embodiments can be practiced can employ. Frame 210 of loader 200 includes an undercarriage or lower portion 211 of the frame and a mainframe or upper portion 212 of the frame that is supported by the undercarriage. The mainframe 212 of loader 200 is attached to the undercarriage 211 such as with fasteners or by welding the undercarriage to the mainframe. Mainframe 212 includes a pair of upright portions 214A and 214B located on either side and toward the rear of the mainframe that support lift arm structure 230 and to which the lift arm structure 230 is pivotally attached. The lift arm structure 230 is illustratively pinned to each of the upright portions 214A and 214B. The combination of mounting features on the upright portions 214A and 214B and the lift arm structure 230 and mounting hardware (including pins used to pin the lift arm structure to the mainframe 212) are collectively referred to as joints 216A and 216B (one is located on each of the upright portions 214) for the purposes of this discussion. Joints 216A and 216B are aligned along an axis 218 so that the lift arm structure is capable of pivoting, as discussed below, with respect to the frame 210 about axis 218. Other power machines may not include upright portions on either side of the frame, or may not have a lift arm structure that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports a pair of tractive elements 219A and 219B on either side of the loader 200, which on loader 200 are track assemblies.

The lift arm structure 230 shown in FIG. 1 is one example of many different types of lift arm structures that can be attached to a power machine such as loader 200 or other power machines on which embodiments of the present discussion can be practiced. The lift arm structure 230 has a pair of lift arms 234 that are disposed on opposing sides of the frame 210. A first end of each of the lift arms 234 is pivotally coupled to the power machine at joints 216 and a second end 232B of each of the lift arms is positioned forward of the frame 210 when in a lowered position as shown in FIG. 2. The lift arm structure 230 is moveable (i.e. the lift arm structure can be raised and lowered) under control of the loader 200 with respect to the frame 210. That movement (i.e. the raising and lowering of the lift arm structure 230) is described by a travel path, shown generally by arrow 237. For the purposes of this discussion, the travel path 237 of the lift arm structure 230 is defined by the path of movement of the second end 232B of the lift arm structure.

Each of the lift arms 234 of lift arm structure 230 as shown in FIG. 2 includes a first portion 234A and a second portion 234B that is pivotally coupled to the first portion 234A. The first portion 234A of each lift arm 234 is pivotally coupled to the frame 210 at one of the joints 216 and the second portion 234B extends from its connection to the first portion 234A to the second end 232B of the lift arm structure 230. The lift arms 234 are each coupled to a cross member 236 that is attached to the first portions 234A. Cross member 236 provides increased structural stability to the lift arm structure 230. A pair of actuators 238, which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm structure 230 to pivot about joints 216 and thereby be raised and lowered along a fixed path illustrated by arrow 237. Each of a pair of control links 217 are pivotally mounted to the frame 210 and one of the lift arms 232 on either side of the frame 210. The control links 217 help to define the fixed travel path of the lift arm structure 230. The lift arm structure 230 shown in FIG. 2 is representative of one type of lift arm structure that may be coupled to the power machine 100. Other lift arm structures, with different geometries, components, and arrangements can be pivotally coupled to the loader 200 or other power machines upon which the embodiments discussed herein can be practiced without departing from the scope of the present discussion. For example, other machines can have lift arm structures with lift arms that each has one portion (as opposed to the two portions 234A and 234B of lift arm 234) that is pivotally coupled to a frame at one end with the other end being positioned in front of the frame. Other lift arm structures can have an extendable or telescoping lift arm. Still other lift arm structures can have several (i.e. more than two) portions segments or portions. Some lift arms, most notably lift arms on excavators but also possible on loaders, may have portions that are controllable to pivot with respect to another segment instead of moving in concert (i.e. along a pre-determined path) as is the case in the lift arm structure 230 shown in FIG. 2. Some power machines have lift arm structures with a single lift arm, such as is known in excavators or even some loaders and other power machines. Other power machines can have a plurality of lift arm structures, each being independent of the other(s).

An exemplary implement interface 270 is provided at a second end 234B of the arm 234. The implement interface 270 includes an implement carrier 272 that is capable of accepting and securing a variety of different implements to the lift arm 230. Such implements have a machine interface that is configured to be engaged with the implement carrier 272. The implement carrier 272 is pivotally mounted to the second end 234B of the arm 234. Implement carrier actuators are operably coupled the lift arm structure 230 and the implement carrier 272 and are operable to rotate the implement carrier with respect to the lift arm structure.

The implement interface 270 also includes an implement power source 274 available for connection to an implement on the lift arm structure 230. The implement power source 274 includes pressurized hydraulic fluid port to which an implement can be coupled. The pressurized hydraulic fluid port selectively provides pressurized hydraulic fluid for powering one or more functions or actuators on an implement. The implement power source can also include an electrical power source for powering electrical actuators and/or an electronic controller on an implement. The implement power source 274 also exemplarily includes electrical conduits that are in communication with a data bus on the excavator 200 to allow communication between a controller on an implement and electronic devices on the loader 200.

The lower frame 211 supports and has attached to it a pair of tractive elements 219A and 219B. Each of the tractive elements 219A and 219B has a track frame that is coupled to the lower frame 211. The track frame supports and is surrounded by an endless track, which rotates under power to propel the loader 200 over a support surface. Various elements are coupled to or otherwise supported by the track frame for engaging and supporting the endless track and cause it to rotate about the track frame. For example, a sprocket is supported by the track frame and engages the endless track to cause the endless track to rotate about the track frame. An idler is held against the track by a tensioner (not shown) to maintain proper tension on the track. The track frame also supports a plurality of rollers, which engage the track and, through the track, the support surface to support and distribute the weight of the loader 200.

Display devices are provided in the cab to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can be dedicated to provide dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as track loader 200, unless otherwise noted or recited, the concepts discussed below are not intended to be limited in their application to the environments specifically described above.

Figure 4:
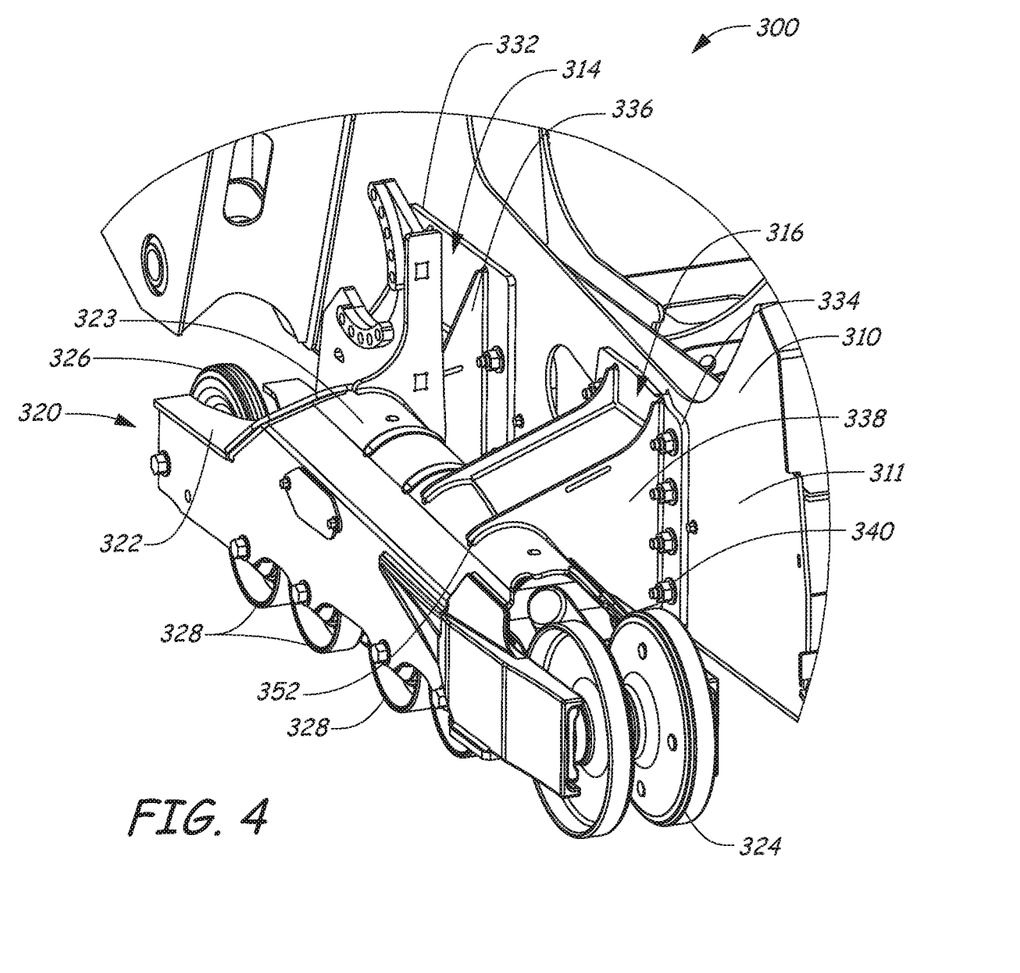
FIG. 4 is a perspective view of track mounts securing a track frame to a power machine frame.
Figure 5:
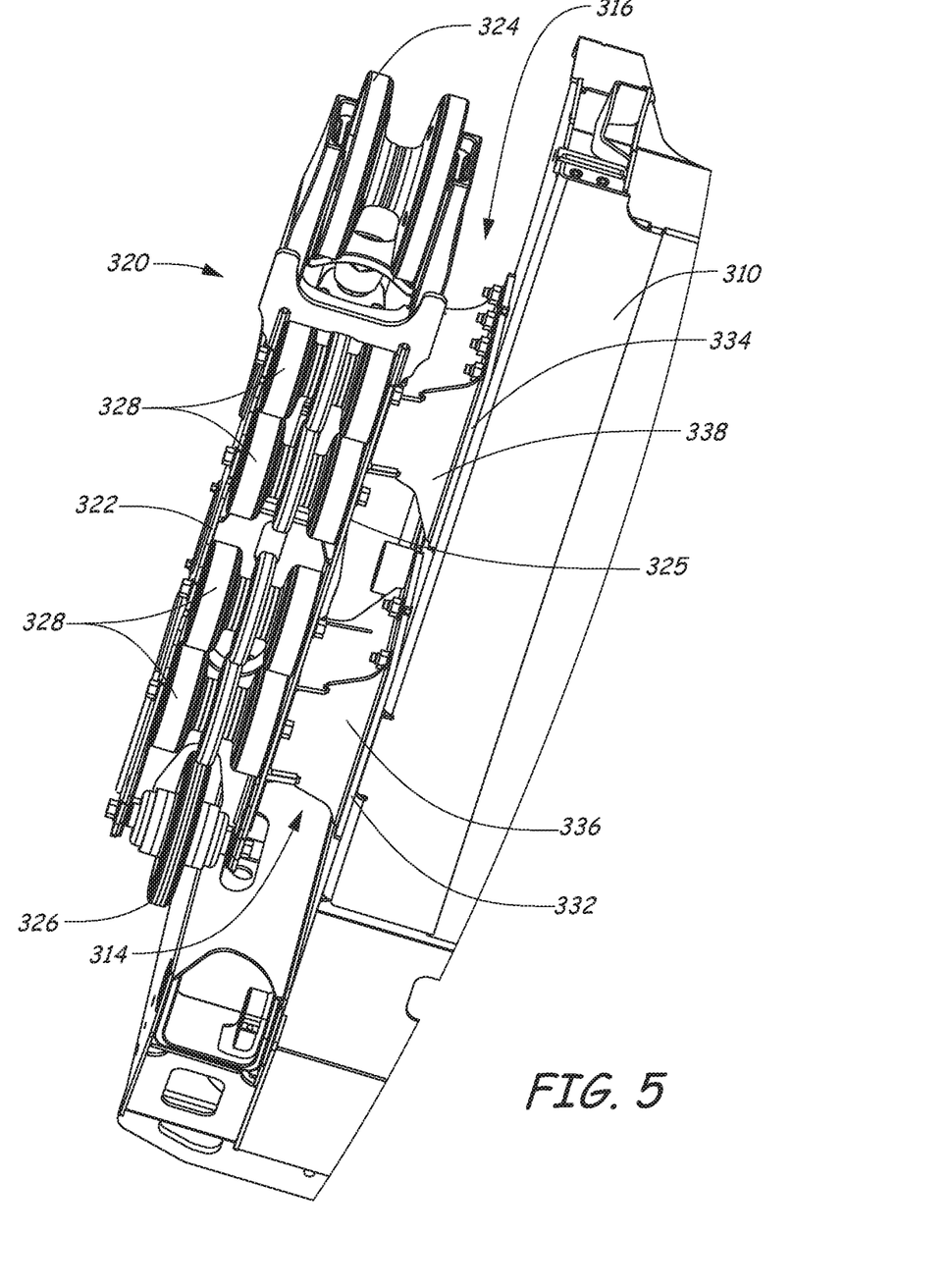
FIG. 5 is a bottom view of the track mounts, track frame and machine frame.
Figure 6:
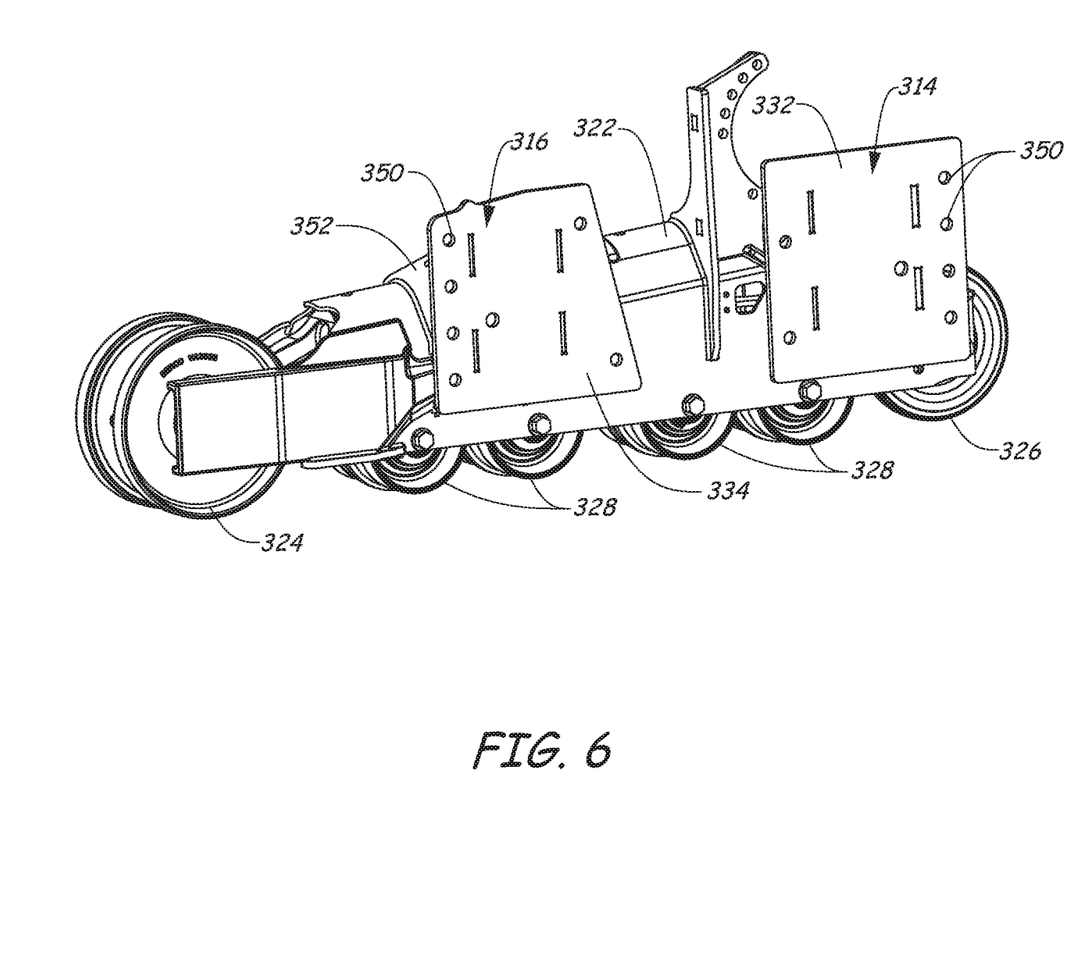
FIG. 6 is a perspective view of the track frame and track mounts shown in FIGS. 4 and 5.
Figure 7:
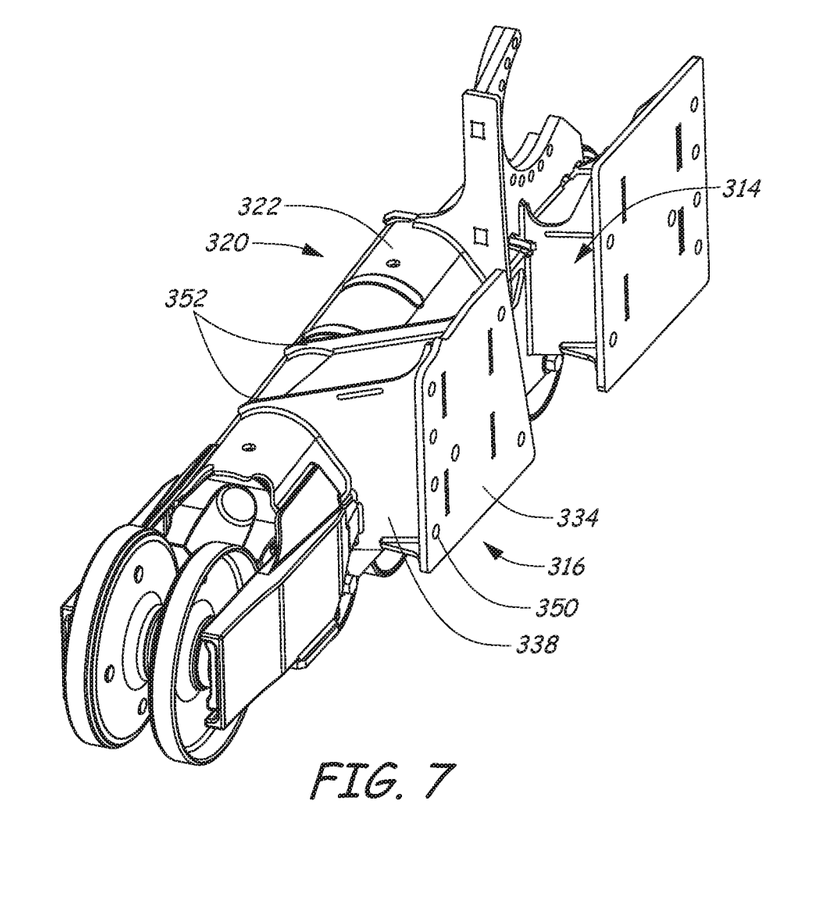
FIG. 7 is another perspective view of a portion of the track frame and track mounts shown in FIGS. 4-6.

Referring now to FIGS. 4-5, shown is a track assembly 320 mounted to a frame 310 of a power machine 300, which can be the same as or similar to track loader 200 shown in FIGS. 2-3. Track assembly supports a continuous track (not shown) which is driven by a motor (not shown). Although not shown (FIGS. 4-5), power machine 300 includes a second track assembly mounted on an opposing side of the frame 310. Track assembly 320 includes a track frame 322 supporting one or more idlers and multiple rollers. In the illustrated embodiment, track assembly 320 includes first and second idlers 324 and 326 and four rollers 328, though other numbers of rollers can be utilized in other embodiments. Track assembly 320 is mounted to frame 310 of the power machine by first and second rigid track mounts 314 and 316. The track mounts 314 and 316 each have a respective mounting flange portion 332, 334 and a respective connecting structure 336, 338 extending between their mounting flange portion and the track frame 322. The mounting flange portions 332, 334 include apertures 350 (shown in FIGS. 6-7), which receive bolts or fasteners 340 to secure the track mounts to a side 311 of the frame 310 of the power machine. Thus, the first and second rigid track mounts 314 and 316 are bolted, and not welded, to the side 311 of the frame 310 in exemplary embodiments.

Advantageously, the first and second rigid track mounts 314 and 316 are bolted to the side 311 of the frame 310, but not to a bottom 312 of the frame. In prior art designs, track mounts that are fastened to both the side and bottom of the frame can slip (due to, for example, wear or loosening of fasteners) in such a way so as to cause the track assemblies to slip or move relative to the frame and cause a negative camber condition (the tracks tend to bow in slightly). This can lead to premature track wear. With this design, any slippage may cause the frame to dip slightly, but the tracks will remain generally vertical and not experience any camber.

In exemplary embodiments, connecting structures 336, 338 of rigid track mounts 314, 316 include some interface portions 352 that are configured to be secured to the top portions 323 of track frame 322. The interface portions 352 can be secured to the top portions 323 by welding the interface portions to the top portions in some embodiments. In other embodiments, other suitable securing mechanisms or structures can be used. In some exemplary embodiments, the interface portions 352 have a curvature that matches a curvature of the track frame to facilitate welding of the track frame to the interface portions of the track mounts. As can best be seen in FIGS. 5-6, in exemplary embodiments the interface portions 352 are configured to be secured to the top 323 of the track frame 322, but not to the bottom of the track frame. The interface portions 352 can also be secured to the sides 325 of the track frame in some embodiments.

Although the present invention has been described with reference to preferred embodiments, workers skilled in the art will recognize that changes may be made in form and detail without departing from the spirit and scope of the invention.

What is claimed is:

1. A track mount for securing a track assembly to a frame of a power machine, the track mount comprising:
a mounting flange having apertures positioned to receive fasteners to secure the mounting flange of the track mount to a side of the frame of the power machine; and
a connecting structure extending between the mounting flange and a track frame of the track assembly, the connecting structure securing the track frame to the frame of the power machine and including an interface portion configured to be directly secured to a top portion of the track frame of the track assembly.

2. The track mount of claim 1, wherein the mounting flange is configured to secure the track mount only to the side of the frame of the power machine and not to a bottom of the frame of the power machine.

3. The track mount of claim 1, wherein the interface portion has a curvature which matches a curvature of the track frame.

4. The track mount of claim 1, wherein the interface portion is configured to be directly secured to the top portion of the track frame and to a side portion of the track frame.

5. The track mount of claim 4, wherein the interface portion is configured to be directly secured to the top portion and to the side portion of the track frame, but not to a bottom portion of the track frame.

6. The track mount of claim 1, wherein the interface portion is configured to be directly secured to a top portion of the track frame of the track assembly by a weld.

7. A power machine, comprising:
a power machine frame;
a first track assembly on a first side of the power machine;
a second track assembly on a second side of the power machine;
first and second track mounts on each side of the power machine and securing the first and second track assemblies to the power machine frame, each of the first and second track mounts comprising:
a mounting flange positioned adjacent a side of the power machine frame and having apertures positioned to secure the mounting flange to the side of the power machine frame using fasteners; and
a connecting structure extending between the mounting flange and a track frame of a respective one of the first and second track assemblies, securing the track frame to the power machine frame and including an interface portion secured to a top portion of the track frame, the interface portion including a curvature that matches a curvature of the top portion of the track frame.

8. The power machine of claim 7, wherein the mounting flange secures the track mount only to the side of the power machine frame and not to a bottom of the power machine frame.

9. The power machine of claim 7, wherein the interface portion is secured to the top portion of the track frame and to a side portion of the track frame.

10. The power machine of claim 9, wherein the interface portion is secured to the top portion and to the side portion of the track frame, and is not secured to a bottom portion of the track frame.

\* \* \* \* \*